June 14, 1927. Re. 16,654

A. LEWERENZ

INSTANTANEOUS SWITCH

Original Filed May 28, 1923 2 Sheets-Sheet 1

Inventor:
Arthur Lewerenz,
by Alexander S. Lent
His Attorney.

June 14, 1927.

A. LEWERENZ

Re. 16,654

INSTANTANEOUS SWITCH

Original Filed May 28, 1923 2 Sheets-Sheet 2

Inventor:
Arthur Lewerenz,
by Alexander S. Lane
His Attorney.

Reissued June 14, 1927. Re. 16,654

UNITED STATES PATENT OFFICE.

ARTHUR LEWERENZ, OF BERLIN, GERMANY, ASSIGNOR TO THE FIRM SCHERBIUS & RITTER, OF WANNSEE, NEAR BERLIN, GERMANY.

INSTANTANEOUS SWITCH.

Original No. 1,516,195, dated November 18, 1924, Serial No. 642,099, filed May 28, 1923. Application for reissue filed April 7, 1926. Serial No. 100,459.

Small sized switches have been built already which work under the influence of the heat and which comprise a strip of sheet metal consisting of two metals possessing different coefficients of expansion due to heat. The movements made by these double metal strips when the temperature changes are infinitesimally small and extremely slow owing to slow admission of the heat so that during the interrupting of the circuit electricity flows still over for a certain time with production of sparks, whereby the contact parts of such switches are rapidly destroyed. With many switches of this type the danger is present that the circuit might be accidentally interrupted if the switch is shaken. With the switches of known type the distance for which the switch travels could be made only disproportionately small so that it was not possible to control higher voltages with such switches owing to the danger of the untimely sparking over.

For many devices, for instance of heating apparatus of smaller size, the dimensions of the switch were far too great so that the heat capacity of the switch influenced unfavorably the distribution of the heat and consequently the accuracy of the regulation.

The heat switch according to the present invention is an instantaneous switch and combines the following essential advantages:—

It is of very small dimensions.

It has a comparatively great switching path with small differences between the switching-in and switching-off temperatures.

It switches instantaneously.

The invention is illustrated by way of example on the accompanying drawing, wherein:—

Figure 1:
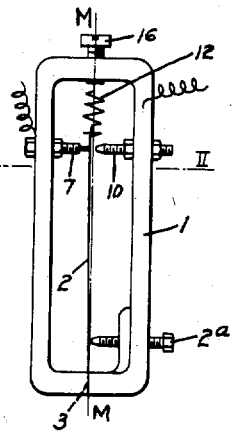
Fig. 1 shows in elevation an instantaneous switch according to the invention.

In a casing an oscillably mounted element, for instance an elastic bi-metal strip 2 is inserted at 3. The bi-metal strip consists of two different kinds of metal, for instance at the left of brass and at the right of iron. At the free end of the strip a kind of head 4 is formed, for instance by bending of the end 5 which has an indentation 6. At the one side of the casing 1 a contact member, consisting of a contact screw 7 with contact pin 8 is inserted in the casing 1 insulated by means of insulating disks 9, said contact member forming an abutment for the bi-metal strip 2 at the one side, the abutment at the other side being formed by a screw 10. At the point where the contact pin 8 is situated a separate contact plate 11 is arranged on the bi-metal strip in order to ensure a secure contact. The contact member 7 is connected with the one pole of a source of current and the casing 1 is connected with the other pole of the source of current.

Figure 2:
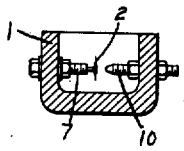
Fig. 2 is a cross section on line II—II of Fig. 1.
Figure 3:
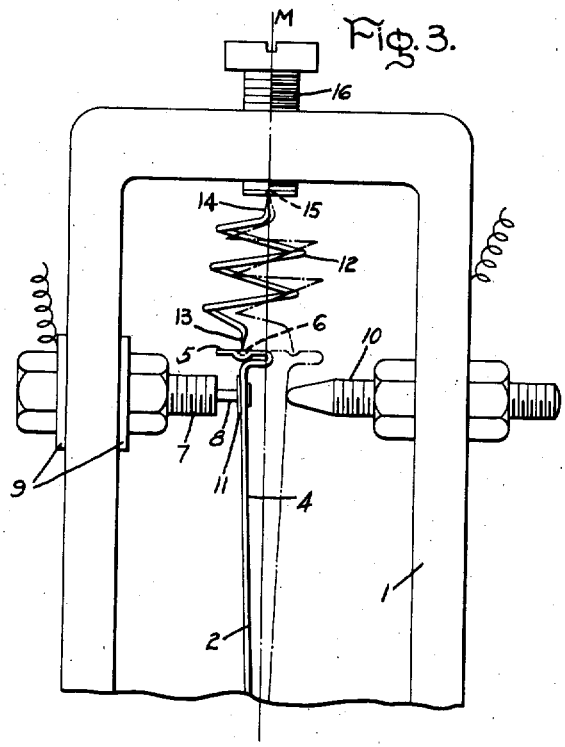
Fig. 3 is a part elevation of the instantaneous switch shown in Fig. 1 but on much enlarged scale.

It is essential that in the casing 1 an elastic support, in the form of construction shown in Figs. 1–3 a helical or spiral spring 12, is arranged which acts upon the free end 4 of the elastic bi-metal strip 2 and which is designed to reduce, at the lifting of the bi-metal strip off the contact member 7 or off the contact pin 8 of the same, the resistance against this lifting off and, after the bi-metal strip has got beyond the middle position, to assist this lifting off so that the opening of the contact is effected instantaneously and not slowly and lingering with sparking over.

The spiral spring 12 has at each end a sharp hardened point 13 and 14 engaging, the one 13, with the indentation 6 of the bi-metal strip and the other 14 with an indentation 15 of an adjusting screw 16.

By adjusting the screw 16 the difference of temperature between the switching in and the switching out is altered, this difference of temperature increasing with the pressure of the elastic support 12 upon the free end 4 of the oscillable element 2. A regulating screw 2* is further provided, which is designed to regulate the contact pressure between the bi-metal strip 2 and the contact pin 8 and to determine the degree of temperature at which the interruption of contact has to take place.

The operation of the instantaneous switch is as follows:

Suppose the regulating screws 2[a] be tightened so that the bi-metal strip is in contact with the contact pin 8 of the contact member 7 with a determined pressure, the circuit being thus closed. The elastic support 12 exerts in this case a determined pressure on the strip approximately in the longitudinal direction of this stop whereby, at the normal position, the contact pressure of the strip upon the contact pin 8 is increased. If the strip is heated the force which tends to lift the strip from the control pin 8 will just overcome at a determined moment the force of the elastic support 12, so that the strip 2 begins to lift off the contact pin. During this lifting of the strip the component diminishes with which the elastic support acts in the sense of pressing the element 2 on the contact pin 8. This component will become zero at the instant when the oscillating element 2 moves through the middle position M—M, and, if the movement of the oscillating element 2 continues, it will exert an increasing force which assists in the lifting of the element 2. The forces of the elastic support 2 acting upon the oscillating element 2 change absolutely uniformly, viz, proportionally to the displacement between the abutments.

Experiments with and without elastic support have shown that the amplitude of the oscillating movement of element 2 at equal differences of temperature is considerably greater if the elastic support 12 is inserted than without this support, provided the elastic amplitude of the oscillating element 2 and the pressure of the elastic support 12 are in a determined relation. This relation may be ascertained easily by adjusting the screw 16.

Figure 4:
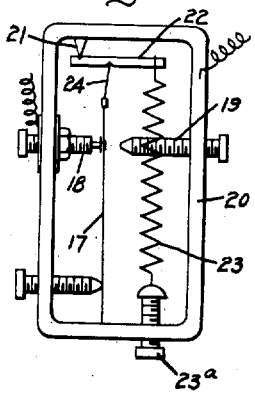
Figs. 4, 5 and 6 show each a slightly modified form of construction of an instantaneous switch.

In the form of construction shown in Fig. 4 an elastic bi-metal strip 17 is used as oscillating element which is adapted to oscillate, same as in the form of construction shown in Figs. 1–3, between an adjustable contact member 18 and a stop screw 19.

A transverse beam 22 is mounted in a casing 20 on a knife edge 21, a spring 23 acting upon the ends of said beam. The tension of the spring 23 may be varied by means of a screw 23[a]. Between the free end of the bi-metal strip 17 and the transverse beam 22 a support 24, composed of steel blades or the like, is inserted with the aid of knife edges so that it is freely movable.

The operation is similar to that described with reference to Figs. 1–3.

Figure 5:
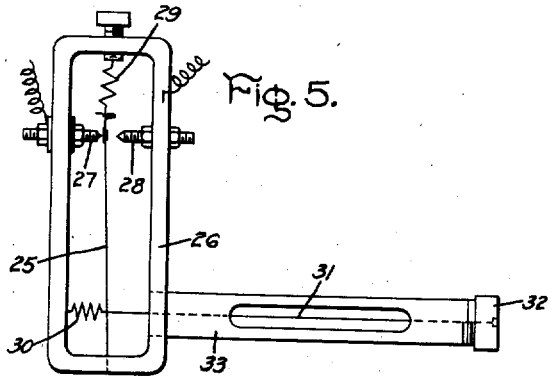

According to Fig. 5 the oscillating element consists of an elastic strip 25 inserted in a casing 26 and adapted to oscillate between an adjustable contact member 27 and an adjustable stop 28. An elastic support 29 of similar construction as shown in Figs. 1–3 acts upon the free end of the oscillating element 25.

The oscillating element 25 is exposed on the one side to the action of a spring 30 which has the tendency to press the oscillating element against the contact member and it is on the other side under the influence of a wire 31 which is attached to a body possessing a different coefficient of expansion. In the form of construction shown this wire, for instance a steel wire, is fixed to a screw cap 32 of a brass tube 33 connected with the casing 26.

The lifting of the oscillating element 25 off the contact 27 is controlled by a force which results from the difference of the longitudinal expansion of the steel wire 31 and of the brass tube 32 at increasing heating, the lifting off being facilitated in the manner described by the elastic support 29 and assisted in such a manner that the lifting off takes place instantaneously.

Figure 6:
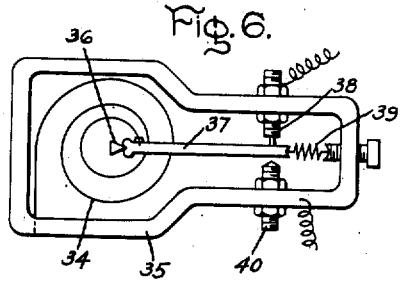

In the form of construction shown in Fig. 6 an elastic bi-metal strip in form of a spiral 34 is fixed with the one end in the casing 35. The other end of the bi-metal strip is attached to an oscillating element 37 mounted on a knife edge 36 and it has the tendency to press normally this element against a contact member 38.

An elastic support 39 and an adjustable stop 40 are arranged as in Figs. 1–3 and 5.

Figure 7:
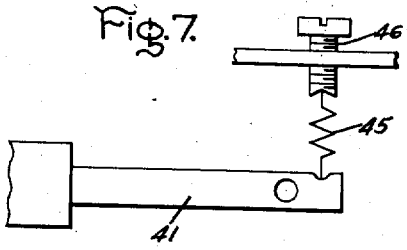
Figs. 7 and 8 show in side elevation and front view respectively a constructional detail of another form of construction.
Figure 8:
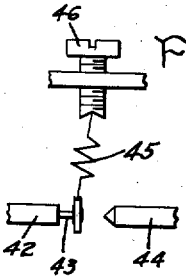

In the form of construction shown in Figs. 7 and 8 an elastic bi-metal strip 41 serves as oscillating element, said strip being adapted to oscillate between a contact member 42 with contact pin 43 and a stop 44.

An elastic support 45 is in this case arranged not in alignment with the bi-metal strip 41 but perpendicularly to the longitudinal axis of said strip and acts on the side edge of this strip. The lifting off from the contact member is in this manner also facilitated and assisted.

The tension of the elastic support 45 and consequently the difference of temperature may be regulated also by means of a regulating screw 46.

The two stops for the oscillating element which are for instance formed by the ends of the contact pin 8 and of the screw 10 (Fig. 3) are preferably arranged at both sides and at equal distances from the middle axis M—M, this being however not absolutely necessary as the distances of the strips may be unequal, the apparatus working even if both strips are situated at the same side of the middle axis.

What I claim as new and desire to secure by Letters Patent of the United States, is,—

1. An instantaneous thermo-switch comprising a thermostatic strip arranged to flex in response to changes in temperature so as to occupy a given position at ordinary temperatures and to move away from said position upon an increase in temperature, elastic means arranged to apply a force to said strip tending to hold said element in said position but to decreasingly resist the movement of said strip away from said position, said elastic means having a single stationary point of support, and switching means operated by said strip.

2. An instantaneous thermo-switch comprising a thermostatic strip arranged to flex upon changes in temperature so that a portion thereof moves between two positions, elastic means arranged to apply a force to said element tending to hold said strip in either one of said positions but to decreasingly resist the movement of said strip away from either position up to a certain point and then to assist the movement of said strip in either direction from said point to the other position, and switching means operated by said strip.

3. An instantaneous thermo-switch comprising a thermostatic strip having a fixed end and arranged to flex in response to changes in temperature so that its other end moves between two positions, a spring having a single stationary point of support, a pivotal connection between said spring and the movable end of said strip, said spring being arranged to apply a force tending to hold said movable end in either position but to decreasingly oppose the movement of said end away from either position up to a certain point and then to assist the movement of said end to the other position, and switching means operated by said strip.

4. An instantaneous thermo-switch comprising a thermostatic strip having a fixed portion and arranged to flex in response to changes in temperature so that another portion moves between two positions, resilient means acting upon said strip to decreasingly resist the movement of said strip away from either position up to a certain point and thereafter to assist the movement of said strip in either direction from said point to the other position, means for adjusting the tension of said resilient means to change the temperature setting, and switching means operated by said strip.

5. An instantaneous thermo-switch comprising a bimetallic thermostatic strip arranged to flex upon changes in temperature so that a portion thereof moves between two positions, a stationary support, a compression spring provided with abutment bearings on said support and said strip, said spring being arranged to apply a force tending to hold said thermostat in either position but to decreasingly oppose the movement of said strip away from either position up to a certain point and then to assist the movement of said strip to the other position, and switching means operated by said strip.

6. An instantaneous thermo-switch comprising a thermostatic strip having a fixed end and arranged to flex in response to changes in temperature so that its other end moves between two positions, a compression spring having a single stationary point of support, a pivotal connection between said spring and the movable end of said strip, said spring being arranged to apply a force tending to hold said movable end in either position but to decreasingly oppose the movement of said end away from either position up to a certain point and then to assist the movement of said end to the other position, switching means operated by said strip, means for adjusting said spring to vary the range of temperature between movements of said strip from one position to the other, and means for adjusting said strip to move said range to a higher or lower temperature as desired.

7. An instantaneous thermo-switch for electric lines comprising in combination, a contact member connected to one pole of a source of current, temperature responsive means connected to the other pole of the source of current and including a strip-shaped switching element for closing and interrupting the circuit, pressed against said contact member at normal temperature by a force and being adapted to move away from the contact member to overcome said force for interrupting the circuit at increasing temperature, an elastic support acting upon the free end of said switching element for assisting the latter to rapidly move away from the contact member only after said element has moved a certain distance away from the contact member, and a stop for limiting the movement away from said member.

8. An instantaneous thermo-switch for electric lines comprising in combination a contact member connected to one pole of a source of current, an elastic strip clamped at one end and connected with the other pole of the source of current, and pressed by spring power at normal temperature against the said contact member, said strip at increasing temperature being adapted to move away from the contact member for interrupting the circuit, an elastic support arranged approximately in the place of said strip and acting upon the free end of the latter for rapidly moving the strip away from the contact member only after said strip has moved a certain distance away from the contact member, means for regulating the spring pressure of said elastic support, and a stop for limiting the movement of said strip away from the contact member.

9. An instantaneous thermo-switch for electric lines comprising in combination a contact screw connected with one pole of a source of current, a contact pin on said screw, an elastic by-metal strip clamped at one end and connected with the other pole of the source of current, said strip being resilient and pressing by its own spring power at normal temperature against said contact pin, an adjustable stop for limiting the oscillation of the by-metal strip, a spiral spring arranged approximately in alignment with the by-metal strip and having at each end a sharp point, a regulating screw having an indentation receiving one of the points of said spiral spring, a head at the free end of the by-metal strip having an indentation receiving the other point of said spiral spring, said spiral spring being adapted to oppose the movement of the strip away from the contact pin to a certain point and to then assist the further movement of the strip away from the contact pin.

10. A switch as claimed in claim 3 including means for pressing the by-metal strip against the contact pin.

11. An instantaneous thermo-switch for electric lines comprising in combination a contact screw connected with one pole of a source of current, a casing in which said contact screw is mounted, means for insulating said screw from said casing, an elastic by-metal strip connected with the other pole of the source of current and having one of its ends clamped in the casing, the other end of the strip being movable toward and away from said screw, a contact plate on the free end of the strip pressed by the resiliency of the latter at normal temperature against said contact pin, a spiral spring arranged approximately in alignment with the by-metal strip and having at each end a sharp point, a regulating screw having an indentation receiving one of the points of said spiral spring, a head at the free end of the by-metal strip having an indentation receiving the other point of said spiral spring, said spring being adapted to resist the movement of the strip away from the contact screw to a certain point and to assist the further movement of the strip away from this point, a screw stop for limiting the movement of the by-metal strip, and a screw for regulating the pressure with which said by-metal strip is pressed against said contact screw.

12. An instantaneous thermo-switch including a contact member adapted to be connected to one pole of a source of current, temperature responsive means including an oscillating conductor strip adapted to be connected to the other pole of the source of current and to bear with its free end at normal temperature against the contact member, said temperature responsive means functioning to move the strip away from the contact member when the temperature increases, and resilient means engaging said strip and functioning to decreasingly resist the movement of the strip away from the contact member up to a certain point and then to rapidly move the strip away from this point.

In witness whereof, I have hereunto set my hand this 23rd day of March, 1926.

ARTHUR LEWERENZ.

CERTIFICATE OF CORRECTION.

Reissue Patent No. 16,654. Granted June 14, 1927, to

ARTHUR LEWERENZ.

It is hereby certified that error appears in the printed specification of the above numbered patent requiring correction as follows: Page 3, line 11, claim 1, for the word "element" read "strip"; and that the said Letters Patent should be read with this correction therein that the same may conform to the record of the case in the Patent Office.

Signed and sealed this 2nd day of August, A. D. 1927.

M. J. Moore,
Acting Commissioner of Patents.

Seal.

ing the spring pressure of said elastic support, and a stop for limiting the movement of said strip away from the contact member.

9. An instantaneous thermo-switch for electric lines comprising in combination a contact screw connected with one pole of a source of current, a contact pin on said screw, an elastic by-metal strip clamped at one end and connected with the other pole of the source of current, said strip being resilient and pressing by its own spring power at normal temperature against said contact pin, an adjustable stop for limiting the oscillation of the by-metal strip, a spiral spring arranged approximately in alignment with the by-metal strip and having at each end a sharp point, a regulating screw having an indentation receiving one of the points of said spiral spring, a head at the free end of the by-metal strip having an indentation receiving the other point of said spiral spring, said spiral spring being adapted to oppose the movement of the strip away from the contact pin to a certain point and to then assist the further movement of the strip away from the contact pin.

10. A switch as claimed in claim 3 including means for pressing the by-metal strip against the contact pin.

11. An instantaneous thermo-switch for electric lines comprising in combination a contact screw connected with one pole of a source of current, a casing in which said contact screw is mounted, means for insulating said screw from said casing, an elastic by-metal strip connected with the other pole of the source of current and having one of its ends clamped in the casing, the other end of the strip being movable toward and away from said screw, a contact plate on the free end of the strip pressed by the resiliency of the latter at normal temperature against said contact pin, a spiral spring arranged approximately in alignment with the by-metal strip and having at each end a sharp point, a regulating screw having an indentation receiving one of the points of said spiral spring, a head at the free end of the by-metal strip having an indentation receiving the other point of said spiral spring, said spring being adapted to resist the movement of the strip away from the contact screw to a certain point and to assist the further movement of the strip away from this point, a screw stop for limiting the movement of the by-metal strip, and a screw for regulating the pressure with which said by-metal strip is pressed against said contact screw.

12. An instantaneous thermo-switch including a contact member adapted to be connected to one pole of a source of current, temperature responsive means including an oscillating conductor strip adapted to be connected to the other pole of the source of current and to bear with its free end at normal temperature against the contact member, said temperature responsive means functioning to move the strip away from the contact member when the temperature increases, and resilient means engaging said strip and functioning to decreasingly resist the movement of the strip away from the contact member up to a certain point and then to rapidly move the strip away from this point.

In witness whereof, I have hereunto set my hand this 23rd day of March, 1926.

ARTHUR LEWERENZ.

CERTIFICATE OF CORRECTION.

Reissue Patent No. 16,654. Granted June 14, 1927, to

ARTHUR LEWERENZ.

It is hereby certified that error appears in the printed specification of the above numbered patent requiring correction as follows: Page 3, line 11, claim 1, for the word "element" read "strip"; and that the said Letters Patent should be read with this correction therein that the same may conform to the record of the case in the Patent Office.

Signed and sealed this 2nd day of August, A. D. 1927.

M. J. Moore,
Acting Commissioner of Patents.

Seal.